June 26, 1962  R. PERLMAN ETAL  3,040,438
SOLIDS FLUIDIZING VESSEL AND GAS DIFFUSER PLATE
AND NOZZLE ELEMENTS THEREFOR
Filed April 27, 1959  2 Sheets-Sheet 1
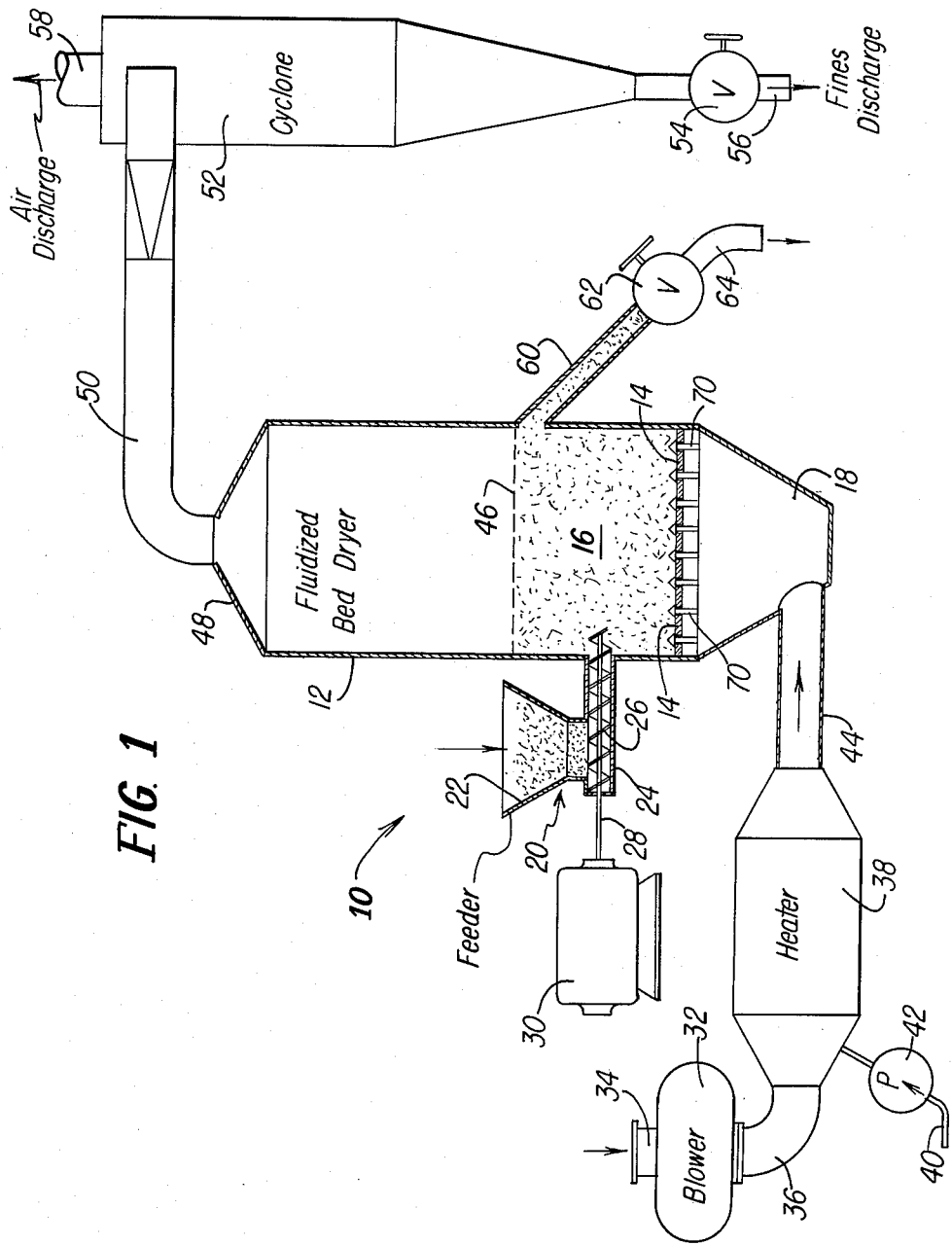
INVENTORS
Raymond Perlman
BY Frank W. Horner Jr.
Attys.

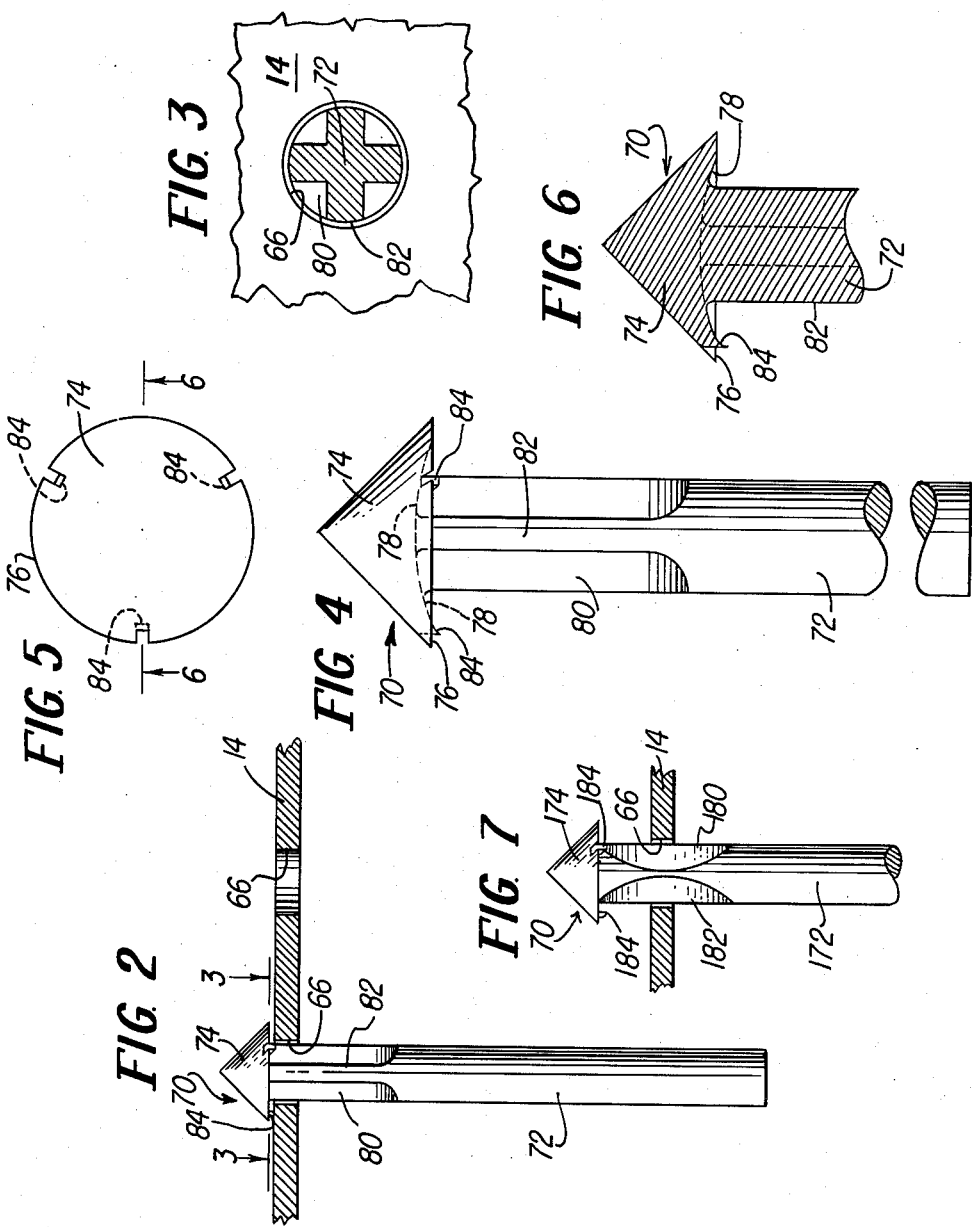

United States Patent Office 3,040,438
Patented June 26, 1962

3,040,438
SOLIDS FLUIDIZING VESSEL AND GAS DIFFUSER
PLATE AND NOZZLE ELEMENTS THEREFOR
Raymond Perlman, Highland Park, and Frank W. Horner,
Jr., Park Ridge, Ill., assignors to General American
Transportation Corporation, Chicago, Ill., a corporation
of New York
Filed Apr. 27, 1959, Ser. No. 809,097
4 Claims. (Cl. 34—57)

The present invention relates to a solids fluidizing apparatus of the type wherein a bed of solids is maintained under solids fluidizing conditions by means of gas passing through a gas diffuser plate and to an improved diffuser plate and nozzle elements therefor.

The present invention has been illustrated in a fluidized bed drier of the type wherein a closed cylindrical vessel is provided with a horizontally disposed apertured partition or plate to divide the vessel into an upper drying chamber and a lower chamber or windbox. The upper chamber is adapted to contain a bed of solids fluidized by passing a stream of gas, such as air, upwardly through the apertured plate and through the bed of solids at solids fluidizing velocities, whereby the solids of the bed are fluidized, i.e., rendered into turbulent mobility so that the solids act like a boiling liquid. The apertured plate serves to distribute and to diffuse the air so as to maintain the solids of the fluidized bed in the proper solids fluidizing condition.

Heating of the fluidized bed of solids is obtained by utilizing heated air as the fluidizing medium, whereby each particle of the solid is surrounded intimately by the heated air to obtain heat transfer to the solid under optimum conditions. The stream of heated air can also be utilized to cause separation of the solids in accordance with the particle size thereof so as to permit separation between the solids and the fines and even separation between the relatively fine material and the relatively coarse material, the fine material being removed from the fluidized bed of solids by the passage of the air stream therethrough, whereby subsequent separation of the fines from the air stream can be achieved to effect recovery of the fines while the larger or coarser material is retained in the fluidized bed for removal, as desired.

Occasionally it is necessary to shut down the fluidized bed drier, for example, for recharging or cleaning thereof, or when changing from the handling of one material to another. In the case of shutdown, it is found that defluidization of the solids of the bed disposed above the diffuser plate permits the solids which are normally smaller in size than the diameter of the apertures in the diffuser plate to sift or spill downwardly therethrough and to accumulate in the windbox therebeneath. This is undesirable since the windbov must then be cleaned which is an expensive and time consuming operation. Various devices have been employed heretofore to prevent the dropping of the solids into the windbox when the drier is shut down, but these prior devices have not been entirely satisfactory in operation.

Vessels containing structure for the establishment of the fluidized beds of solids therein have been cleaned heretofore only with difficulty because of the difficulty in shutting down the apparatus and further because of the complicated construction of the gas diffuser plates which have been utilized heretofore. Furthermore, the gas diffuser plates ordinarily are designed to operate with a particular solid material under predetermined and precise operating conditions and cannot be readily converted to accommodate other solid materials under substantially different operating conditions. Other problems are encountered in stabilizing the fluidized bed during operation, and still other problems are encountered in initiating operation of the drier and establishing the fluidized bed therein, which problems have not been adequately solved by the prior devices.

Accordingly, it is an important object of the present invention to provide an improved vessel for establishing and holding a fluidized bed of solids therein and particularly an improved gas diffuser plate and nozzle elements therefor.

Another object of the invention is to provide an improved gas diffuser plate in which the gas passages or openings therein are always substantially covered, thereby to prevent passage of solids into the windbox provided beneath the gas diffuser plate, regardless of whether gas is passing through the openings.

Another object of the invention is to provide a control structure for a gas diffuser plate of the type noted which tends to stabilize the fluidized bed and to facilitate fluidizing of the bed while starting operation thereof.

A further object of the invention is to provide a gas diffuser plate of the type noted having nozzle elements disposed in the openings thereof, the nozzle elements resting upon the plate so as substantially to close the openings therein, thereby to prevent solids from falling through the openings while permitting the flow of gas past the nozzle elements and through the plate, thereby to facilitate fluidization of the bed of solids supported by the plate.

Yet another object of the invention is to provide a gas diffuser plate having nozzle elements therein of the type noted, wherein the nozzle elements can be readily removed to facilitate cleaning of the plate.

A further object of the invention is to provide a gas diffuser plate having nozzle elements therein of the type noted, wherein the nozzle elements can be readily changed, thereby to accommodate different solid materials within the fluidized bed and to permit operation at different gas pressures across the diffuser plate and at different rates of gas flow through the diffuser plate.

A still further object of the invention is to provide a nozzle element for use in a solids fluidizing vessel and with a diffuser plate of the type noted.

Further features of the invention pertain to the particular arrangement of the elements of the gas diffuser plate and nozzle elements thereof, whereby the above-outlined and additional operating features thereof are attained.

The invention, both as to its organization and method of operation, together with further objects and advantages thereof, will best be understood by reference to the following specification, taken in connection with the accompanying drawings, in which:

FIGURE 1 is a diagrammatic and schematic illustration, with certain portions in section, of apparatus embodying the present invention and employed for establishing a fluidized bed of solids therein, that is particularly useful for drying the solids and effecting a particle size separation thereof, together with the auxiliary equipment used therewith;

FIG. 2 is a fragmentary vertical sectional view taken through the diffuser plate forming a part of the apparatus of FIG. 1, and illustrating the structure thereof and of a nozzle element in association therewith, particularly embodying the present invention;

FIG. 3 is an enlarged view in horizontal section substantially as seen in the direction of the arrows along the line 3—3 in FIG. 2;

FIG. 4 is an enlarged view with certain portions broken away of the nozzle element forming a portion of the nozzle structure for the air diffuser plate of FIG. 2;

FIG. 5 is an enlarged plan view of the nozzle element of FIG. 4;

FIG. 6 is an enlarged fragmentary view in vertical section through the head of the nozzle element, taken along the line 6—6 of FIG. 5; and FIG. 7 is another fragmentary vertical sectional view, similar to FIG. 2, and illustrating a modified form of the nozzle element embodying the present invention.

Referring now to FIG. 1, of the drawings, there is shown apparatus 10 incorporating the improved gas diffuser plate and nozzle elements embodying the features of the present invention; and more specifically there is illustrated a fluidized bed drier 10 of the single-stage drying type and also including therein structure to effect a size classification of the solids being dried. It is to be understood that the gas diffuser plate and the nozzle elements of the present invention are useful in other structures employing beds of fluidized solids, and the fluidized bed drier 10 has been shown in the drawings and described only as being illustrative of one particular application of the improved gas diffuser plate and the nozzle elements of this invention.

The fluidized bed drier 10 includes an upstanding cylindrical vessel 12 which is preferably formed of metal and is provided intermediate the ends thereof with a generally horizontally disposed gas diffuser plate 14 which divides the vessel 12 into an upper chamber holding a bed 16 of solids to be fluidized above the plate 14 and a lower chamber therebeneath and comprising the usual windbox 18.

The material to be treated in the vessel 12 is delivered thereto by a feeder 20 and including a hopper 22 in which the material is placed for delivery to a screw type conveyor including a housing 24 and a feed screw 26 disposed therein. The housing 24 is connected to the wall of the vessel 12 and communicates with the interior thereof at a point disposed substantially at the midpoint vertically of the fluidized bed 16, and the conveyor screw 12 may actually extend into the bed 16 as illustrated. The screw 26 is provided with a drive shaft 28 which is connected to the drive shaft of a suitable electric drive motor 30, whereby operation of the motor 30 will rotate the screw 26 about its axis and feed solid materials from the hopper 22 into the upper zone or chamber of the vessel 12 in which the fluidized bed 16 is established.

Hot gases are preferably utilized in the vessel 12 to establish the fluidized bed 16 so that the solids in the bed 16 are heated and thereby dried as well as being separated as to size. To this end a blower 32 is provided having an intake pipe 34 connected to a suitable source of atmospheric air, the outlet of the blower 32 being connected to a high pressure pipe 36 communicating with a heater 38. Any suitable fuel, such as oil, is fed from a source (not shown) through a pipe 40 by means of a pump 42, whereby the air from the blower 32 mixing with the oil can be ignited, so as to heat the air and the combustion gases to the desired temperature. The hot combustion gases, together with any excess air from the blower 32, are fed through a pipe 44 to the windbox 18 and particularly to the lower portion thereof. The windbox 18 is of the usual frusto-conical construction and may be provided with a cleaning port (not shown). The upper end of the windbox 18 connects directly with the lower end of the vessel 12 thereby substantially to seal the bottom end thereof, and more particularly connects therewith at a point below the horizontally disposed diffuser plate 14.

Air passing upwardly from the windbox 18 through apertures in the diffuser plate 14 will serve to fluidize any solids in the zone of the bed 16 thereby to establish a substantially stable bed which rises to a level indicated by the numeral 46, the level 46 being held substantially constant by regulating the addition of material to the vessel 12 and the withdrawal therefrom in combination with the regulation of the gases supplied from the windbox 18. The hot gases rising through the bed 16 are brought into intimate contact with the solids therein thereby to effect heat transfer between the hot gases and the solids so as to evaporate any water or other liquids on the solids and thus effect drying thereof. In addition, the velocity of the gases through the fluidized bed 16 may be sufficient to entrain the smaller solid particles thereby to carry the smaller particles above the level 46 and into the upper end of the vessel 12 disposed thereabove.

The upper end of the vessel 12 disposed above the level 46 is covered by a frusto-conical member 48 which in turn is attached to and internally communicates with a pipe 50 connected to the upper portion of a cyclone 52. The cyclone 52 serves to separate any solid materials entrained in the gas stream in the usual manner thereby to permit the solid materials to fall downwardly within the cyclone 52 and through a discharge valve 54 into a discharge pipe 56, the material falling therethrough being ordinarily referred to as "fines" to distinguish the same from the particles of larger size which remain in the fluidized bed 16. The gases after separation from the solid fines are discharged from the upper end of the cyclone 52 through a pipe 58, for example, into the atmosphere.

Dried solids too large to be entrained in the gas stream passing through the vessel 12 are preferably continuously discharged from the bed 16 through a pipe 60 which is connected to the vessel 12 at a point below the level 46 defining the upper surface of the fluidized bed, the pipe 60 extending downwardly and having a valve 62 therein which can be periodically opened to discharge dried solids through a product discharge pipe 64.

From the above it can be seen that solids having a substantial liquid content such as water therein and also consisting of both particles of regular size and particles of a smaller size or "fines" can be fed into the hopper 22 and substantially continuously discharged into the fluidized bed 16. The blower 32 operates under a substantially constant pressure to supply air to the heater 38 which is provided with a substantially constant volume per unit time of oil or other combustible material from the pump 42 thereby to produce heated gases having a substantially constant volume passing through the pipe 44 and into the windbox 18 per unit of time. The heated gases pass upwardly through the apertured diffuser plate 14 first to fluidize the solids to provide the bed 16 and also to heat and dry the solids and to separate the fines therefrom. The cooled gases and the water vapor and the vapors of other liquids in the feed material together with the fines pass upwardly through the pipe 50 and into the cyclone 52 where the fines are separated therefrom for discharge through the valve 54, the gases being discharged through the pipe 58 to the atmosphere. The dried product of standard size may be periodically or substantially continuously withdrawn from the fluidized bed 16 through the pipe 60 and the valve 62. It is to be understood that the valves 54 and 62 operate in such a manner so as not adversely to affect the pressure within the system or to permit the escape of gases under pressure therefrom.

The gas diffuser plate 14 is provided with a plurality of apertures 66 therein which may be circular in shape as illustrated (see particularly FIG. 3); and in accordance with the present invention each of the apertures 66 is provided with a nozzle element 70 therein thereby to form with the wall of the aperture 66 a nozzle to regulate the flow of gases through the passage between the plate 14 and the nozzle element 70. Each of the nozzle elements 70 has the general form of a rivet, and is referred to hereinafter as a "rivet" in the interest of brevity. Each of the rivets 70 includes a generally cylindrical shank 72 having a conical head 74 on the upper end thereof. The shape of the head 74 in plan view is substantially circular in outline as seen in FIG. 5, the circular base 76 of the head 74 being substantially larger in diameter than the aperture 66 in the plate 14. The undersurface of the head 74 is concave or dished to provide a generally semi-spherical surface 78. The shank 72 is provided with channels or grooves or flutes 80 in the portion thereof adjacent to the head 74, four flutes 80 being shown in the shank 72 and providing four lands 82 of equal angular extent as viewed in FIG. 3 and disposed apart equi-distantly thereby to provide a cross section having the shape of a cross and particularly the shape of a Greek cross. Three legs 84 are struck from the head 74 around the periphery thereof and extend downwardly below the base 76 of the head 74, the legs 84 being arranged in a generally circular disposition about the axis of the shank 72 and equiangularly disposed thereabout. The circle defined by the ends of the legs 84 has a diameter greater than that of the apertures 66 in the plate 14 whereby the legs 84 serve to hold the base 76 of the head 74 above the upper surface of the plate 14 thereby to provide a passage from the lower side of the plate 14 to the upper side thereof about the rivet 70 and through the aperture 66.

Preferably the rivet 70 is formed of metal and may be for example formed of a stainless steel so as to withstand the temperatures and any chemical attack of corrosive gases contained in the gas stream passing thereby into the upper chamber of the vessel 12. The weight of each of the rivets 70 is the main factor in holding the same in the proper operating position with respect to the diffuser plate 14; and accordingly, the weight of the rivet 70 for any particular application is determined by the differential pressure which is to be maintained across the diffuser plate 14 and the relationship between the cross-sectional area of the passage defined by the rivets 70 and walls of the apertures 66 in the plate 14 and the total volume of gas to flow therethrough. In a typical installation the weight of each of the rivets 70 may be 0.15 pound thereby to give the desired operating characteristics thereof. The diameter of the shanks 72 is chosen so that a free, loose and sliding fit is obtained in the apertures 66 of the plate 14; and for example, when the apertures 66 have a diameter of ½ inch, the diameter of the shanks 72 may be 7/16 inch. The length of the shanks 72 is chosen to give the desired weight; and in this typical rivet 70, the length from the surface defined by the base 76 of the head 74 to the end of the shank 72 may be 3⅞ inches.

The diameter of the head 74 must be sufficiently great so as to prevent the rivet 70 from dropping through the aperture 66 and must further be adequate to permit the formation of the legs 84 in such a manner that the legs 84 will support the rivet 70 upon the plate 14 with the head 74 disposed above the upper surface thereof, the maximum diameter of the head 74 being limited by the spacing between the holes 66. In this typical rivet 70, the diameter of the head 74 and therefore of the base 76 may be ⅞ inch. The inclination of the upper surface of the head 74 to the horizontal has been illustrated as being 45°, and this angle is so chosen so as to minimize the buildup of solid materials thereon when the bed 16 is defluidized; and, accordingly, the angle of the surface of the head 74 with respect to the horizontal should be greater than the angle of repose of the material in the bed 16. This will facilitate the initiation of operation and the fluidization of the material to form the bed 16 when starting operation of the apparatus.

The flutes 80 provide the major paths of flow for gases about the rivet 70 and upwardly through the aperture 66 and into the fluidized bed 16. In this typical rivet 70, the lands 82 have a transverse dimension of ⅛ inch and the fluting is arranged to provide a resultant shank having the shape of a Greek cross as is illustrated in FIG. 3 of the drawings. The upper ends of the flutes 80 communicate directly with the concave semi-spherical surface 78 formed on the underside of the head 74.

As has been explained above, the three legs 84 are spaced apart 120° and support the head 74 of the rivet 70 above the upper surface of the plate 14. Preferably the legs 84 of this typical rivet 70 have a length such that they support the outer edge of the base 76 of the head 74 about 0.020 inch above the upper surface of the plate 14 thereby to provide a clear passage for gas about the rivet 70 and upwardly through the plate 14 when fluidizing the solids in the bed 16. This feature, together with the properly chosen minimum weight of the rivet 70 permits the proper amount of fluidizing gas to pass upwardly through the diffusion plate 14, without disturbing or moving the rivet 70. Further, the gas is deflected by each rivet 70 radially outwardly therefrom over the plate 14 to perform a sweeping or scrubbing action thereon.

It is to be understood that in a commercial form of the apparatus 10, the diffuser plate 14 will have a substantial number of the apertures 66 therein and may have, depending upon the size of the apparatus 10, from about 5,000 to about 10,000 of such apertures and a corresponding number of the rivets 70 respectively disposed therein.

When the fluidized bed drier 10 is placed in operation, or after any shutdown thereof, all of the rivets 70 will remain disposed with the bottoms of the legs 84 resting upon the upper surface of the plate 14 as is illustrated in FIG. 2 of the drawings. There may or may not be a small quantity of the solids to be treated resting upon the head 74; and in any event, the amount of product resting thereon is minimized by the angle of the surface thereof with respect to the horizontal. To begin operation of the drier 10, the blower 32 is started as are the heater 38 and the feed motor 30 thereby to produce a stream of heated gases. The gases pass into the windbox 18 and upwardly about the shanks 72 of the rivets 70 and into the passages formed by the flutes 80 therein. Then, the gases are directed by the flutes 80 of each rivet 70 upwardly against the concave surface 78 thereof and radially outwardly from under the head 74 thereof and through the space provided by the legs 84 and between the head 74 and the upper surface of the plate 14 and into scrubbing relation with the upper surface of the plate 14 and into the bed 16 of solids, thereby to effect fluidizing thereof. The weight of each rivet 70 holds the same in its rest position, as illustrated in FIG. 2, even after the pressure of the gases on the underneath side of the head 74, and against the concave surface 78, is sufficient to bring about fluidizing of the bed 16, as noted above. Any solids on the head 74 will be quickly incorporated into the fluidized bed 16 and will, therefore, exert substantially no downward pressure upon the rivet 70. Accordingly, it will be understood that the weight of each of the rivets 70 is greater than the upward lifting force that is exerted thereon so that the desired differential pressure is maintained between the lower and upper surfaces of the plate 14 without lifting or moving of the rivet 70 out of the opening or aperture 66 provided in the plate 14 during the operation of the apparatus 10.

When it is necessary to shut-down the apparatus 10 by stopping the flow of gases into the windbox 18, the solid material in the bed 16 will settle downwardly upon the diffuser plate 14 and some of the material will settle upon the rivet heads 74. The angle of inclination of the upper surfaces of the heads 74 will cause the material to flow downwardly and outwardly therefrom and the overhanging edges of the bases 76 of the heads 74 will further prevent the solids from falling downwardly through the apertures 66 and into the windbox 18. It will be understood therefore that substantially no solid material will fall downwardly past the rivets 70 through the apertures 66 in the plate 14 thereby to burden the windbox 18.

When it is desired to clean the plate 14, while the apparatus is shut down, the rivets 70 can be readily removed by simply lifting upwardly, since there is no structure, fixedly or otherwise, retaining them in position upon the plate 14. Once the rivets 70 are removed, the upper and lower plane surfaces of the plate 14 can be readily cleaned, since there will be no obstructions thereon. Also, it will be understood that the construction of plate 14 is very simple, requiring no special machining or configuration of the apertures 66.

In certain instances it will also be desired to change the operating conditions while the drier 10 is shut down, such, for example, so as to handle a different type of solid material. In such a case it may be desirable to substitute a different size and weight of rivets 70 for that originally used, thereby to permit a larger or a smaller pressure drop across the plate 14 and to permit a lower or a higher operating pressure and gas velocity within the fluidized bed 16. Exchange of the rivets 70 for different sizes thereof can be readily accomplished, since the rivets in position can be easily removed by lifting upwardly and the new rivets can be quickly placed in operative position by simply inserting the shanks 72 thereof through the apertures 66 in the diffuser plate 14. With the new rivets 70 in position, the rivets will again act automatically to control the pressure differential across the diffuser plate 14 by permitting the gases at the desired rate of flow to be admitted into the fluidized bed 16 and at the desired pressure. The presence of the legs 84 will facilitate fluidization of the bed 16 since a restricted passage for gases about the rivets 70 will be provided during the operation, and thereafter as pressure is built up upon the undersurfaces of the heads 74, the rivets 70 will remain in their rest positions, as previously explained, wherein the forces exerted on the undersides of the rivets and particularly the heads 74 thereof are not in excess of the weights of the rivets 70.

Referring now to FIG. 7, a modified form of the rivet 170 is there illustrated that embodies the features of the present invention and that is essentially the same as the rivet 70, previously described, except that in this case, the flutes 180 that are formed in the shank of the rivet 172 have a non-uniform cross-sectional area. Specifically, each of the flutes 180 is substantially segmental in cross section, so that it has a maximum cross-sectional area in the midportion thereof decreasing progressively toward the opposite ends thereof. Accordingly, each of the flutes 180 has minimum cross-sectional areas both at a point disposed immediately adjacent to the undersurface of the head 174 and at another point disposed well downwardly upon the shank 172, with the cross-section of maximum area disposed substantially midway between the two points mentioned.

In view of this particular construction of the modified form of the rivet 170, a modified operation thereof is effected in the apparatus 10; and more particularly, when the apparatus 10 is shut down, so that there is no pressure in the windbox 18, the weight of the rivet 170 causes it to move downwardly into a rest position in which it is supported by the feet 184 in direct engagement with the upper surface of the plate 14.

When operation of the apparatus 10 is initiated and positive pressure is developed in the windbox 18, the upward pressure developed upon the shank 172 of the rivet 170 causes the rivet 170 to move upwardly in order to accommodate a flow at a greater rate of air through the four flutes 180; which, of course, is maximized when the position of maximum cross-sectional area of the flutes 180 is disposed generally within the aperture 66. Hence, the rivet 170 moves upwardly from its previously-mentioned rest position into the operating position, as shown in FIG. 6, thereby to accommodate the passage of air at a predetermined rate through the four flutes 180 from the windbox 18 into the fluidized bed 16, the rate being established by the particular design characteristics of the rivet 170, and including both the weight of the rivet 170 and the particular configuration of the four flutes 180 formed therein.

Subsequently, when the apparatus 10 is shut down and positive pressure is relieved in the windbox 18, the rivet 170 is returned by virtue of its own weight from its operating position, as shown in FIG. 7, into its previously-mentioned rest position, corresponding to that of the rivet 70, as illustrated in FIG. 2. In this connection, it will be observed that the rivet 170 has a normal operating position, wherein the areas of maximum cross section of the four flutes 180 occupy a predetermined position with respect to the plate 14, and substantially within the aperture 66, thereby positively establishing automatically the operating position of the rivet 170 incident to operation of the apparatus 10 with the desired and predetermined positive pressure in the windbox 18; which arrangement is very advantageous in view of the fact that it prevents the rivet 170 from being blown out of its operating position in the plate 14 into the fluidized bed 16.

Of course, it will be understood that the rivets 170 may be readily removed from the apertures 66 formed in the plate 14 for the cleaning purpose as previously explained; and furthermore, it will be appreciated that the rivets 170 are appropriately designed in different weights and sizes to accommodate different desired differential pressures and rates of gas flow between the windbox 18 and the fluidized bed 16 through the apertures 66 formed in the diffusion plate 14.

While the apparatus 10 has been disclosed in conjunction with the drying of the material in the fluidized solids bed by the hot gases passing therethrough, it will be understood that the arrangement is also useful when the gases are utilized for cooling or chemical treating of the materials in the fluidized solids bed, or where the materials in the fluidized solids bed serve as a heat exchange or treatment medium for the gases, liquids or solids being processed in the fluidized solids bed of the apparatus.

In view of the foregoing, it is apparent that there has been provide in apparatus utilizing beds of fluidized solids, an improved gas diffuser plate incorporating improved nozzles therefor.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In a solids fluidizing vessel including a plate therein provided with substantially circular apertures therethrough and dividing said vessel into an upper solids fluidizing chamber and a lower windbox chamber, and a plurality of nozzle elements respectively associated with the apertures in said plate; each of said nozzle elements including a substantially cylindrical shank arranged in the associated aperture and extending a short distance above said plate and a substantial distance below said plate, said shank having no lateral dimension that is not slightly less than the diameter of said associated aperture to accommodate ready placement and removal of said nozzle element with respect to said associated aperture by simply lifting said shank vertically upwardly therethrough, a head carried by the upper end of said shank and overlying and substantially covering the associated aperture, a plurality of circumferentially spaced-apart feet carried by said head and extending downwardly therefrom and engaging the upper side of said plate to support said nozzle element in the associated aperture and to position said head a short distance above said plate, said shank having a plurality of circumferentially spaced-apart elongated flutes provided therein and extending upwardly to a position disposed above the upper side of said plate and immediately below said head and extending downwardly to a position disposed well below the lower side of said plate, whereby gases in said lower chamber pass upwardly in a controlled stream through said flutes and through the space between said shank and the wall of the associated aperture and against the underside of said head and then over the upper side of said plate and thence into the bed of fluidized solids disposed in said upper chamber, said shank being sufficiently long that said nozzle element has adequate weight to retain the same in place in the associated aperture against the controlled stream of gases passing upwardly through said flutes and through the space between said shank and the wall of the associated aperture.

2. The combination set forth in claim 1, wherein each of said nozzle elements is formed essentially of stainless steel.

3. In a solids fluidizing vessel including a plate therein provided with substantially circular apertures therethrough and dividing said vessel into an upper solids fluidizing chamber and a lower windbox chamber, and a plurality of nozzle elements respectively associated with the apertures in said plate; each of said nozzle elements including a substantially cylindrical shank arranged in the associated aperture and extending a short distance above said plate and a substantial distance below said plate, said shank having no lateral dimension that is not slightly less than the diameter of said associated aperture to accommodate ready placement and removal of said nozzle element with respect to said associated aperture by simply lifting said shank vertically upwardly therethrough, a head carried on the upper end of said shank and having an upright conical shape and provided with a base overlying and substantially covering the associated aperture, the angle of inclination of the conical surface of said head with respect to the horizontal being greater than the angle of repose of the solids disposed in said upper chamber, a plurality of circumferentially spaced-apart feet carried by the base of said head and extending downwardly therefrom and engaging the upper side of said plate to support said nozzle element in the associated aperture and to position the base of said head a short distance above said plate, said shank having a plurality of circumferentially spaced-apart elongated flutes provided therein and extending upwardly to a position disposed above the upper side of said plate and immediately below said head and extending downwardly to a position disposed well below the lower side of said plate, whereby gases in said lower chamber pass upwardly in a controlled stream through said flutes and through the space between said shank and the wall of the associated aperture and against the underside of said head and then over the upper side of said plate and thence into the bed of fluidized solids disposed in said upper chamber, said shank being sufficiently long that said nozzle element has adequate weight to retain the same in place in the associated aperture against the controlled stream of gases passing upwardly through said flutes and through the space between said shank and the wall of the associated aperture.

4. In a solids fluidizing vessel including a plate therein provided with substantially circular apertures therethrough and dividing said vessel into an upper solids fluidizing chamber and a lower windbox chamber, and a plurality of nozzle elements respectively associated with the apertures in said plate; each of said nozzle elements including a substantially cylindrical shank arranged in the associated aperture and extending a short distance above said plate and a substantial distance below said plate, said shank having no lateral dimension that is not slightly less than the diameter of said associated aperture to accommodate ready placement and removal of said nozzle element with respect to said associated aperture by simply lifting said shank vertically upwardly therethrough, a head carried by the upper end of said shank and overlying and substantially covering the associated aperture, the underside of said head being concave, a plurality of circumferentially spaced-apart feet carried by said head and extending downwardly therefrom and engaging the upper side of said plate to support said nozzle element in the associated aperture and to position said head a short distance above said plate, said shank having a plurality of circumferentially spaced-apart elongated flutes provided therein and extending upwardly to a position disposed above the upper side of said plate and immediately below said head and extending downwardly to a position disposed well below the lower side of said plate, whereby gases in said lower chamber pass upwardly in a controlled stream through said flutes and through the space between said shank and the wall of the associated aperture and against the concave underside of said head and then downwardly and radially outwardly therefrom over the upper side of said plate and thence into the bed of fluidized solids disposed in said upper chamber, said shank being sufficiently long that said nozzle element has adequate weight to retain the same in place in the associated aperture against the controlled stream of gases passing upwardly through said flutes and through the space between said shank and the wall of the associated aperture.

References Cited in the file of this patent

UNITED STATES PATENTS

| 2,061,830 | Campbell | Nov. 24, 1936 |
| 2,712,962 | Goodard | July 12, 1955 |
| 2,856,264 | Dunn | Oct. 14, 1958 |

FOREIGN PATENTS

| 20,550 | Great Britain | 1909 |
| 83,890 | Netherlands | Jan. 15, 1957 |
| 796,753 | Great Britain | June 18, 1958 |